Oct. 3, 1967  KAZUO NAKAGAWA ET AL  3,345,584
SWEEP OSCILLATOR
Filed Dec. 9, 1965

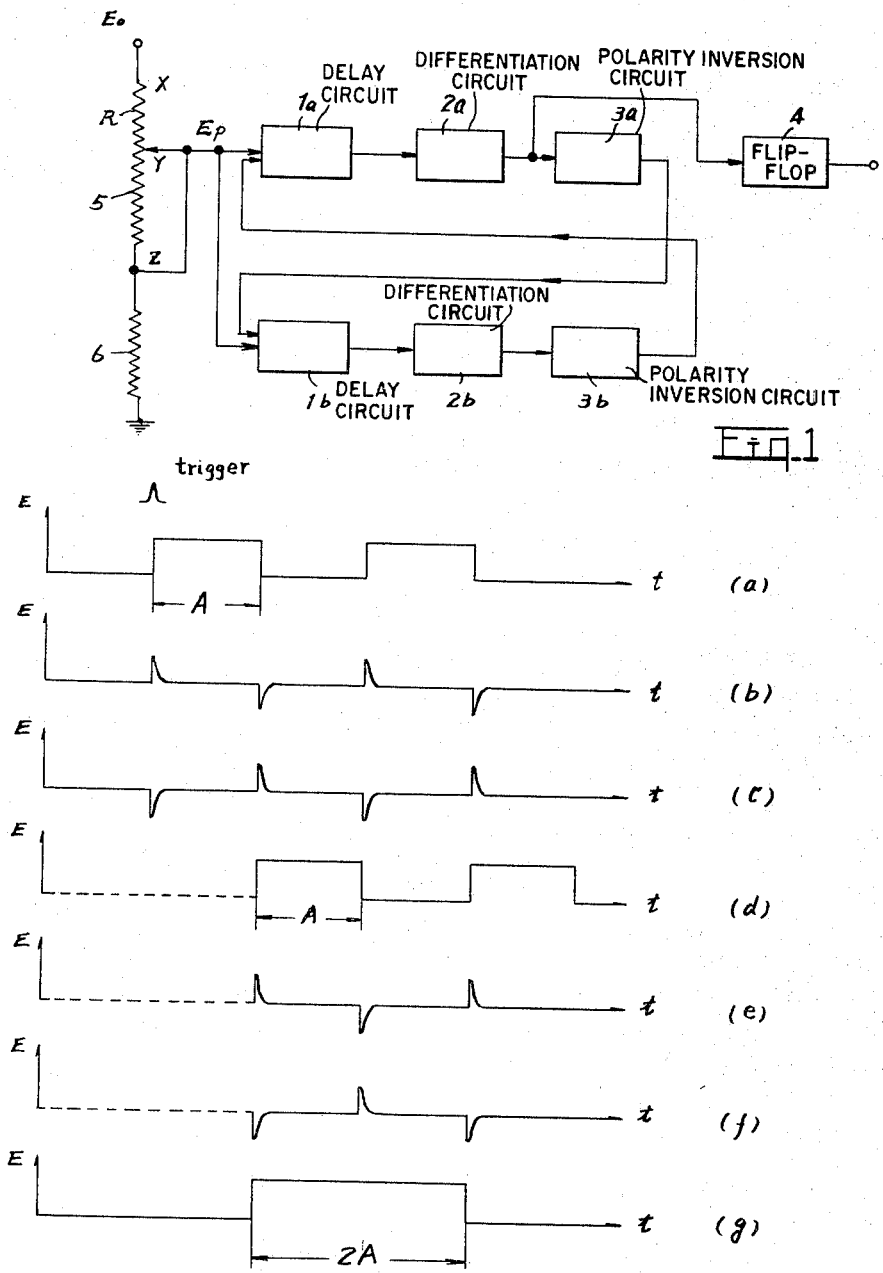

INVENTOR.
K. Nakagawa
BY T. Ikeda
Webb Burden Robinson & Webb

United States Patent Office 3,345,584
Patented Oct. 3, 1967

3,345,584
SWEEP OSCILLATOR
Kazuo Nakagawa and Takeyoshi Ikeda, Tokyo, Japan, assignors to Nihon Denshi Kabushiki Kaisha, Tokyo, Japan
Filed Dec. 9, 1965, Ser. No. 512,764
1 Claim. (Cl. 331—143)

ABSTRACT OF THE DISCLOSURE

A voltage responsive sweep oscillator which includes a voltage divider network for controlling the frequency of the apparatus and two circuits in series having a pair of delay circuits, a pair of differentiation circuits, and a pair of polarity inversion circuits. The voltage divider network has a pair of selectable resistor circuits and a variable resistor in the selection means such that the variable resistor is in series with each selected resistor circuit whereby the frequency of the apparatus is variably controlled by the resistance in the variable resistor and a selected circuit. The band width is determined by the resistance of a selected circuit alone.

---

Figure 3:
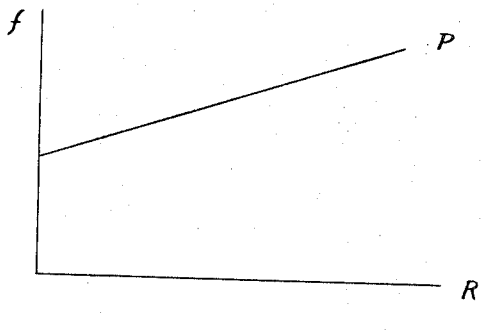

This application relates to a variable frequency oscillator which is particularly useful in nuclear magnetic resonance apparatus, and, therefore, it will be described with reference thereto. However, it is to be understood that our sweep oscillator has other uses.

In the use of magnetic resonance apparatus, a volume of matter which contains portions of atoms, such as, for example, protons or other nuclei, possessing the properties of magnetic moment and gyroscopic moment is positioned in a strong, steady, undirectional magnetic field. This strong magnetic field polarizes the atom portions in the direction of the magnetic field. A radio frequency magnetic field is applied to the atom portions at an angle to the polarizing field by means of a transmitter coil. The atom portions precess in the field resulting from the unidirectional magnetic field and the radio frequency field and produce a rotating magnetic field of the same angular rate as the applied radio frequency. This rotating magnetic field may be detected and will be at a maximum strength when it is in resonance with the radio frequency magnetic field. At that time the following relationship is satisfied.

$$2\pi f_o = \nu H_o$$

where:

$f_o$ = frequency of the radio frequency magnetic field
$\nu$ = gyromagnetic ratio of a sample
$H_o$ = polarized magnetic field In the use of such apparatus it has heretofore been the practice to keep the radio frequency magnetic field $f_o$ constant in order to simplify the apparatus and to vary the strength of the polarized magnetic field $H_o$. The resonance signal of the portions of atoms being examined is then observed as a function of the strength of the unidirectional magnetic field.

Generally, however, direct accurate measurement of the value of the polarized magnetic field is difficult, and this is particularly true in the case of a chemical shift in the sample being examined.

There is now available a counter-type frequency meter for accurately measuring radio frequency and there is also available nuclear magnetic resonance apparatus in which a signal from the sample being examined is used to control the strength of the polarized magnetic field and keep it at a constant value. Accordingly, it has been proposed to maintain the strength of the unidirectional magnetic field constant by means of a signal from a known sample and to vary the frequency of the radio frequency magnetic field by sweeping it with an audio-frequency. The sweep oscillator which we have invented generates a sweeping audio-frequency which has a high degree of linearity. In addition to providing a high degree of linearity our sweep oscillator can be used to vary the width of the band over which the audio-frequency is varied. For example, the frequency may be varied from 4 kc. to 5 kc. or from 4 kc. to 7 kc. Our sweep oscillator can also be used to maintain a frequency band of constant width and vary the position of the band. For example, our sweep oscillator can maintain a constant band width of 0.5 kc. and vary the frequency over a range of from 4.5 kc. to 5 kc. or from 5.2 kc. to 5.7 kc., etc.

Figure 5:
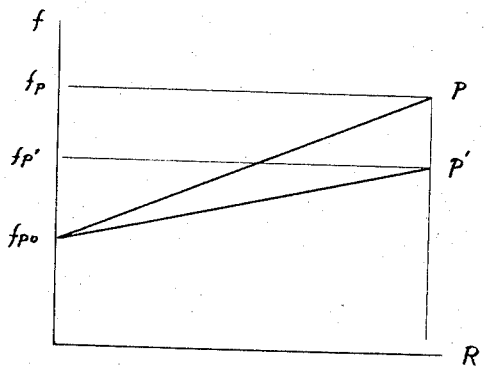
Figure 2:
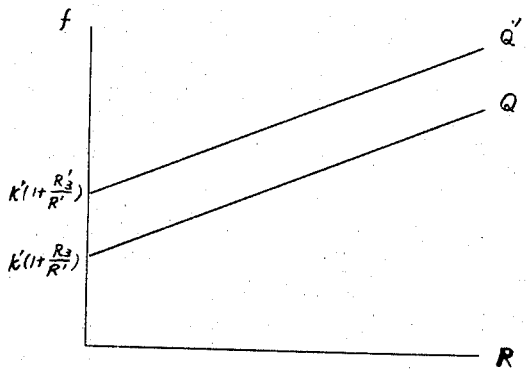
Figure 4:
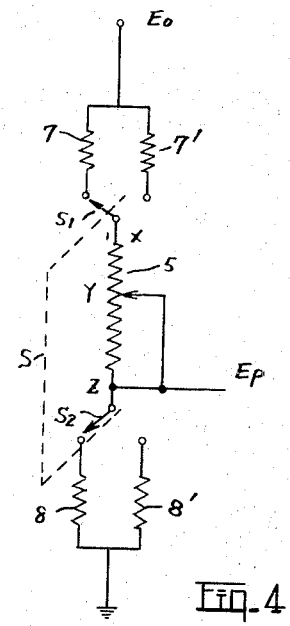
Figure 6:
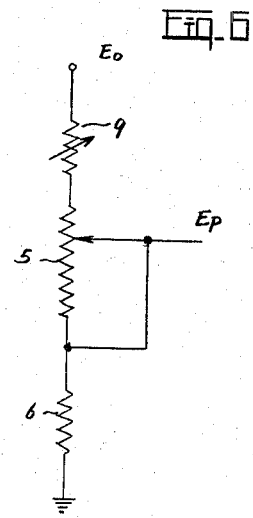

In the accompanying drawings we have illustrated certain presently preferred embodiments of our invention in which:

FIGURE 1 is a block diagram of our sweep oscillator;
FIGURE 2 is a graph of wave forms of outputs of various parts of the apparatus shown in FIGURE 1;
FIGURE 3 is a graph showing the relationship between frequency and resistance of a potentiometer forming part of the apparatus of FIGURE 1;
FIGURE 4 is a diagram of a second form of voltage divider which may be used in the apparatus of FIGURE 1;
FIGURE 5 is a graph showing the relationship between frequency and the resistance of the voltage divider shown in FIGURE 4;
FIGURE 6 is a diagram showing a third form of voltage divider which may be used in the apparatus shown in FIGURE 1; and,
FIGURE 7 is a graph showing the relationship between frequency and resistance of the voltage divider shown in FIGURE 6.

Referring to FIGURE 1, the oscillator which we have invented includes delay circuits $1_a$ and $1_b$ which may be phantastrons, sanatrons or Miller sweep circuits, the output of which is proportional to the anode voltage $E_p$. The circuit also includes differentiation circuits $2_a$ and $2_b$, polarity inversion circuits $3_a$ and $3_b$ and a flip flop circuit 4.

The circuit also includes a potentiometer 5 having a linearity of the order of 0.1% and a resistor 6. The potentiometer 5 and resistor 6 are connected in series between ground and a source of voltage $E_o$. The anode voltage $E_p$ applied to the delay circuits $1_a$ and $1_b$ is derived from the point Z where the resistors 5 and 6 are connected together, and the contact point Y of the potentiometer and the point Z are connected together as shown in FIGURE 1.

To explain the operation of the circuit shown in FIGURE 1 it will be assumed that the delay circuit $1_a$ is a screen grid coupled phantastron circuit which is operated by a trigger connected to a controlling grid. Voltage $E_p$ is applied to the anode of the phantastron tube, and the positive pulse outright of the phantastron circuit is directly proportional to the value of the voltage $E_p$. The width of the pulse is represented by the letter A in FIGURE 2(a). In FIGURE 2 the ordinate shows the amplitude E and the abscissa indicates time $t$. The differentiation circuit $2_a$ changes the shape of the pulse from the delay circuit $1_a$ to that shown in FIGURE 2(b). The polarity inversion circuit $3_a$ changes the delay pulse from the differentiating circuit $2_a$ to the positive delay pulse shown in FIGURE 2(c).

The output from the inversion circuit $3_a$ is fed to the second phantastron circuit $1_b$. This phantastron circuit will not operate on negative trigger pulses, but only on the positive pulses, and, therefore, the output of the phantastron $1_b$ is in the form of a pulse such as is shown in FIGURE 2(d).

If the circuit constants of the phantastron circuits $1_a$ and $1_b$ are equal and if the anode voltages of these circuits are equal, the output pulse width of the phantastron $1_b$ is equal to the pulse width A of the phantastron circuit $1_a$. This output is differentiated by the second differentiation circuit $2_b$, the output of which is shown in FIGURE 2(e). The output of the differentiation circuit $2_b$ is inverted by a polarity inversion circuit $3_b$, the output of which is shown in FIGURE 2(f). The inverted output from the polarity inversion circuit $3_b$ is supplied to the phantastron circuit $1_a$ which produces a positive pulse of width A. The output of delay circuit $1_a$ is fed to a differentiating circuit $2_a$, and the output of this second circuit is applied as a pulse to the flip flop circuit 4 which produces a periodic pulse of a width twice that of width A, as shown in FIGURE 2(g).

The circuit is initially triggered by hand or by a relay, and thereafter it produces a pulse such as is shown in FIGURE 2(g). The frequency of this pulse is varied by the voltage divider circuit including the potentiometer 5 and resistor 6, as will now be explained.

The width A of the output pulse is proportional to the anode voltage $E_p$. The audio frequency $f$ is shown by the following formula:

$$f = \frac{1}{2A} \alpha \frac{1}{E_p} \quad (1)$$

The voltage $E_p$ is determined by adjustment of the potentiometer 5 and may be determined from the following equation:

$$E_p = E_0 \frac{R'}{R+R'}$$

where R is the value of the potentiometer between the points X and Y and R' is the value of the resistance 6.

Combining the above two formulas, the frequency $f$ may be expressed as follows:

$$f \alpha \frac{(1+R)}{R'} \cdot \frac{1}{E_0} \quad (2)$$

The relationship is shown by the straight line P in FIGURE 3 in which the value of the resistance R of the potentiometer 5 is plotted against the audio-frequency $f$.

As appears from Formula 2 the slope of the straight line P is determined by the resistance R' of the resistor 6 and the voltage $E_0$. And the band of frequencies over which the frequencies can be varied is determined by setting the resistance R' and the voltage $E_0$. The characteristics of the potentiometer 5 and the phantastron circuits $1_a$ and $1_b$ determine the linearity of the circuit, which should be in the order of about $10^{-3}$.

As is known, the phantastron circuit is a negative feedback circuit having a high stability against variations in power input, cathode heater voltages, etc. Therefore, the frequency output of the oscillator is highly stable.

FIGURE 4 shows the voltage divider circuit which may be employed in the circuit shown in FIGURE 1 to vary the width of the frequency band over which the frequencies are varied without varying the initial starting frequency. In this circuit resistances 7 and 7' are connected alternately to the high voltage terminal of the potentiometer 5 by a switch $S_1$. Resistors 8 and 8' are connected to the low voltage terminal of the potentiometer 5 through a switch $S_2$. Switches $S_1$ and $S_2$ are interlocked so that when resistor 7 is connected to the potentiometer 5 the resistor 8 is also connected to the potentiometer, and when the resistor 7' is connected to the potentiometer 5 the resistor 8' is also connected to the potentiometer. Letting $R_1$, $R'_1$, $R_2$ and $R'_2$ represent the values of the resistors 7, 7', 8 and 8' respectively, then the values of the resistors must bear the following relationship:

$$\frac{R_1}{R_2} = \frac{R'_1}{R'_2}$$

Then the anode voltage $E_p$ becomes $$E_p = \frac{R_2}{R_1 + R + R_2} E_0 \quad (3)$$

Combining Formulas 1 and 3 the sweep frequency $f$ is shown by the following formula:

$$f = K\left(1 + \frac{R_1}{R_2} + \frac{R}{R_2}\right) \quad (4)$$

where K is a constant.

FIGURE 5 is a graph of Formula 4. The minimum frequency $fpo$ of the frequency band is determined by the value of $$\left(1 + \frac{R_1}{R_2}\right)$$

and the slope of the straight line P is determined by the value of $(1/R_2)$. By selecting different values of resistance $R_2$ and by varying the potentiometer 5 the frequency can be varied with a high degree of linearity. The slope of the straight line P is changed when the value of the resistance $R_2$ is changed and the value of the resistance $R_1$ is constant. Thereby the width of the frequency band is changed as desired. However, the frequency $fpo$ is also changed which is undesirable.

To prevent a change in the frequency $fpo$ and at the same time vary the band width, the resistance $R_1$ and $R_2$ must be changed so that they maintain a constant value for $$\left(1 + \frac{R_1}{R_2}\right)$$

This is done by use of the switches $S_1$ and $S_2$. Thus, when these switches are moved to connect the resistors 7' and 8', the slope of the straight line P in FIGURE 5 can be changed to the value of $1/R'_2$ without changing the minimum frequency $fpo$; thereby the relationship, $R_1/R_2$ is equal to $R'_1/R'_2$, is maintained. By this arrangement the band over which the frequency is varied can extend from $fpo$ to $f_p$ or from $fpo$ to $f'_p$.

Moreover, the resistors 7 and 8 or the resistors 7' and 8' may be changed for other resistors having different values, so long as the ratio $R_1/R_2$ is maintained.

FIGURE 6 shows a voltage divider circuit which can be used in the circuit of FIGURE 1 in which the lowest starting frequency is changed, but in which the width of the band over with the frequency is changed is maintained constant. In this voltage divider circuit a variable resistance 9 is connected between the source of voltage $E_0$, and the high voltage terminal of the potentiometer 5. Letting $R_3$ be the value of the resistance of resistor 9, then the frequency $f$ is shown by the following formula:

$$f = K'\left(1 + \frac{R_3}{R'} + \frac{R}{R'}\right) \quad (5)$$

where K' is a constant.

From Formula 5 it appears that the minimum frequency is $$K'\left(1 + \frac{R_3}{R'}\right)$$

and the slope is determined by the value of $1/R'$ which is independent of the resistance $R_3$.

FIGURE 7 is a graph of Formula 5 in which the slope of the straight line Q indicates the range of frequencies over which the frequency is varied. If the value of resistance $R_3$ is changed to $R'_3$, the straight line Q will shift to the line Q' but the slope of the line (which shows the band width) remains constant. Therefore, using the voltage divider circuit shown in FIGURE 6, it is possible to change the starting frequency while maintaining a constant band width over which the frequency is varied.

The circuits just described make it possible to linearly sweep a radio frequency magnetic field in nuclear magnetic resonance apparatus with an audio frequency and to change the width of the band over which the audio frequency is swept. It is also possible to maintain the same band width and change the starting or lowest frequency of the band width. Our sweep oscillator is particularly useful for measuring chemical shift in nuclear magnetic resonance apparatus.

While we have illustrated certain presently preferred embodiments of our invention, it is to be understood that they may be otherwise variously embodied within the scope of the appended claim.

We claim:

A sweep oscillator comprising:
(A) a voltage source;
(B) a voltage divider network having
  (a) a first and second pair of resistors, the resistors of each pair being connected in parallel, said first pair being connected to the high potential of said voltage source, one of said first pair of resistors adapted to be series connected to one of said second pair of resistors to define a first resistor circuit, the other of said first pair of resistors adapted to be series connected to the other of said second pair of resistors to define a second resistor circuit, the ratio of said resistances defining said first resistor circuit being substantially the same as the ratio of the resistances defining said second resistor circuit;
  (b) a potentiometer, the output of the voltage divider network being taken from the potentiometer;
  (c) a pair of switches, one of said switches being connected to the high potential terminal of said potentiometer and the other of said switches being connected to the low potential terminal of said potentiometer, each of said switches being adapted to connect alternatively one of said first and second pairs of resistors to said potentiometer, said switches being interlocked to alternatively connect through said potentiometer said first resistor circuit and said second resistor circuit;
(C) an input voltage controlled oscillator including
  (a) first and second delayed pulse circuits, each circuit having in series
    (i) a time delay circuit the output of said voltage divided network is connetced,
    (ii) a differentiation circuit; and,
    (iii) a polarity inversion circuit,
  (b) the output of the first delayed pulse circuit being connected to the input of the second delayed pulse circuit and the output of the second delayed pulse circuit being connected to the input of the first delayed pulse circuit; and
  (c) a flip flop circuit having its input connected to the output of the differentiation circuit of the first delayed pulse circuit, the output of the flip flop circuit constituting the output of the sweep oscillator.

References Cited

UNITED STATES PATENTS

| 2,835,815 | 5/1958 | Cones | 331—134 |
| 3,233,197 | 2/1966 | Deichen | 331—177 |

FOREIGN PATENTS

| 896,679 | 5/1962 | Great Britain. |

OTHER REFERENCES

Grey et al.: Electronics, "Wide-Band Data Transmitter," pp. 168–170, September 1953, 331–152.

ROY LAKE, *Primary Examiner.*

JOHN KOMINISKI, *Examiner.*

UNITED STATES PATENT OFFICE
CERTIFICATE OF CORRECTION

Patent No. 3,345,584  
October 3, 1967

Kazuo Nakagawa et al.

It is hereby certified that error appears in the above numbered patent requiring correction and that the said Letters Patent should read as corrected below.

Column 1, line 35, for "undirectional" read -- unidirectional --; column 2, line 57, for "outright" read -- output --; column 4, line 32, for "resistance" read -- resistances --; column 6, line 10, after "circuit" insert -- to which --.

Signed and sealed this 19th day of November 1968.

(SEAL)
Attest:

Edward M. Fletcher, Jr.  
Attesting Officer

EDWARD J. BRENNER  
Commissioner of Patents